April 8, 1930.                L. GAISMAN                1,753,826
                    KNEE GRIP FOR MOTOR BICYCLES
                       Filed Feb. 4, 1929        2 Sheets-Sheet 1
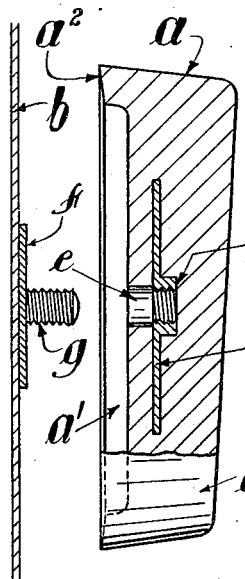
Fig. 1.
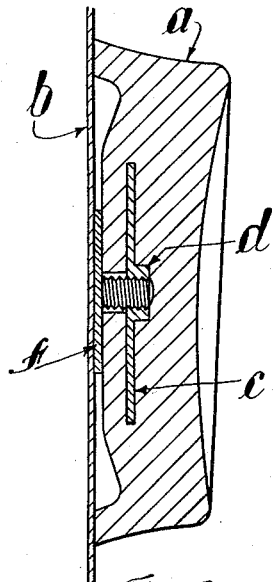
Fig. 2.
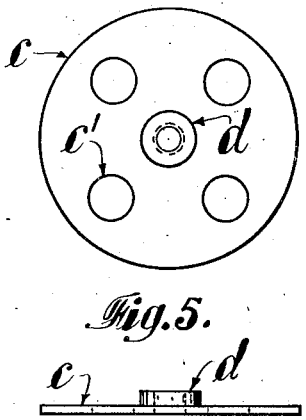
Fig. 5.
Fig. 4.
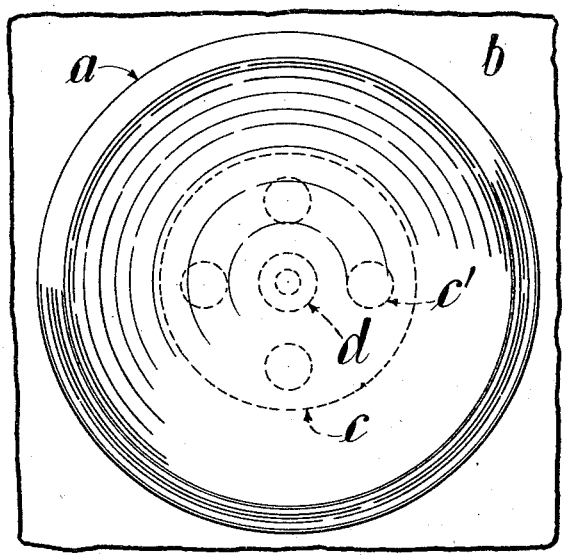
Fig. 3.
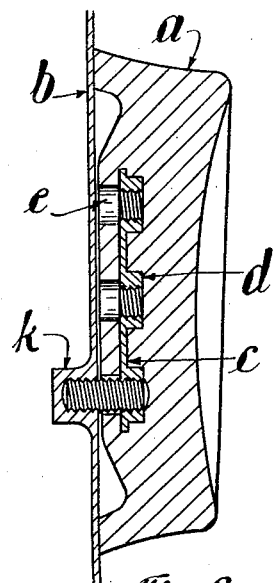
Fig. 6.
Inventor:
Lucien Gaisman.
By his Attorney: Walter Gunn April 8, 1930. L. GAISMAN 1,753,826
KNEE GRIP FOR MOTOR BICYCLES
Filed Feb. 4, 1929 2 Sheets-Sheet 2

Inventor:
Lucien Gaisman.
By his Attorney: Walter Gunn.

Patented Apr. 8, 1930

1,753,826

UNITED STATES PATENT OFFICE

LUCIEN GAISMAN, OF AUDENSHAW, NEAR MANCHESTER, ENGLAND

KNEE GRIP FOR MOTOR BICYCLES

Application filed February 4, 1929, Serial No. 337,462, and in Great Britain February 25, 1928.

This invention refers to improvements in or relating to knee grips for motor bicycles.

The chief object of the invention is a knee grip which affords a very soft yielding cushion for the knee, and which, when fixed in position and by the act of fixing is caused to conform on its working face with the shape of the knee, thus ensuring of a firm contact between the knee and the grip. A further object is to provide means for connecting the grip to the motor bicycle, which form an integral part of the grip, and dispense with the need of tools or loose accessory parts for fixing the grip.

Knee grips according to this invention are characterized in that in fixing them to a bicycle tank, their working faces are thereby caused to assume a dished or concave formation, or, if already dished, to assume an increased concave formation.

According to one example of the invention, each knee grip comprises a slab-like block of india-rubber, circular, oval, oblong or other convenient peripheral shape, that face of the block which is to form the working face of the knee grip, i. e., the face in contact with the knee of the rider being normally flat or only slightly concave. Such block fits against the side of the petrol tank of the motor bicycle, and on the face next the tank, the block is formed with a large diameter recess, and also with a small hole or sinking in the recessed face. The recess is preferably similar in shape to the peripheral shape of the block, and the width and length of the recess are such as to leave only a comparatively narrow lip or rim all around the rear face of the block.

Intermoulded with the block is a metal plate or washer with central aperture. In one with said plate and co-axial with the sinking or hole in the rubber block and the aperture in the plate is a screwed bush or boss. Such bush or boss, as also the hole or sinking and aperture in the plate may be other than central. Or, there may be more than one bush or boss and sinking, and one central and the other or others eccentric.

Secured to and projecting from the tank side is a screwed stud, or a grub screw. To fix the rubber block to the motor bicycle it is simply screwed on the said projecting screw by means of the screwed boss of the intermoulded plate, and owing to the large diameter recess on the face of the block next to the tank, the tight screwing of the block on to the screw causes the working face of the block, which as described above is normally flat, to assume a dished or concave formation, suitable for the rider's knee to engage when gripping the block.

Instead of being moulded flat, the working face of the block may be moulded slightly concave, which concave shape is increased on fixing the block to the tank. At the same time the rim of the block next the tank adapts itself accurately to the shape of the petrol tank, whether the latter is flat or curved.

In a modification, the screw may be fixed to the metal plate in the rubber block, and a screwed bush may be secured to the tank fitting. The block will preferably be made of sponge rubber, with smooth exterior faces, but it may be made of ordinary rubber, or of a combination of materials, one of which is rubber.

Upon the accompanying drawing:—

Fig. 1 illustrates a section of the side wall of a motor cycle petrol tank, and a part cross section of one on the improved knee grips ready for attachment to the tank wall.

Fig. 2 illustrates a cross section of the knee grip as it appears after being attached to the tank wall.

Fig. 3 illustrates a side view of the knee grip and part of the tank.

Fig. 4 illustrates an edge view, and

Fig. 5 a plan of the metal plate separate from the knee grip.

Fig. 6 illustrates a further cross section of the knee grip, but with the connection to the tank effected at a point eccentric to the axis of the knee grip.

Figures 7, 8:
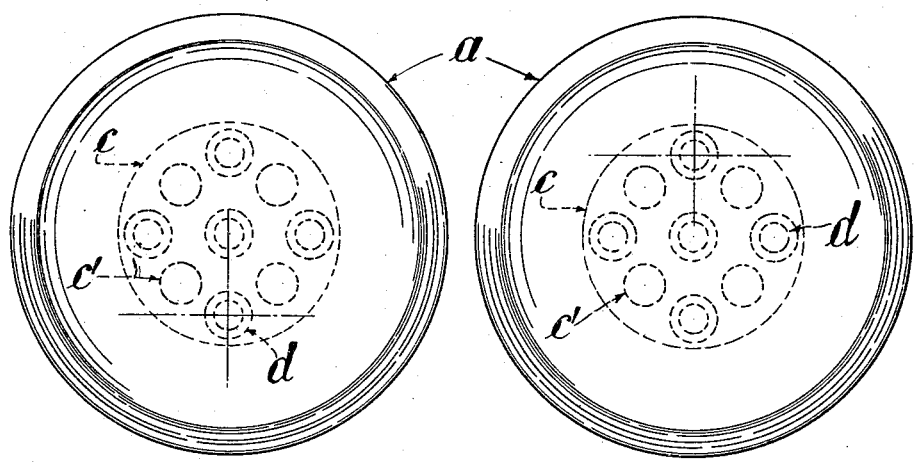

Fig. 7 illustrates a side view of Fig. 6.

Fig. 8 illustrates a like view of Fig. 7.

Figure 9:
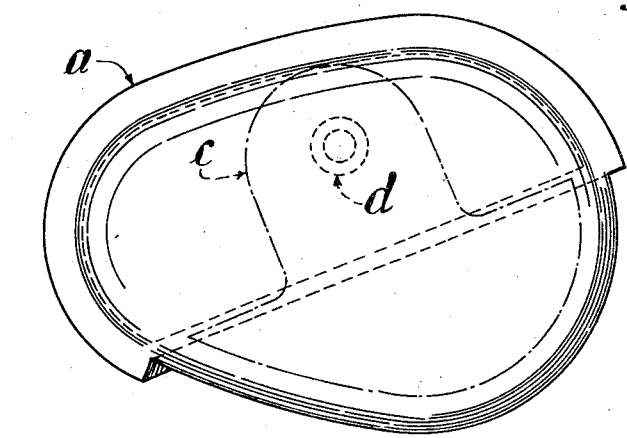
Figure 10:
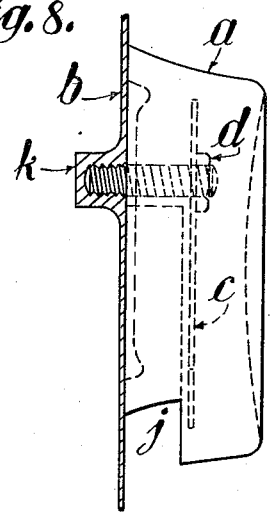
Figure 11:
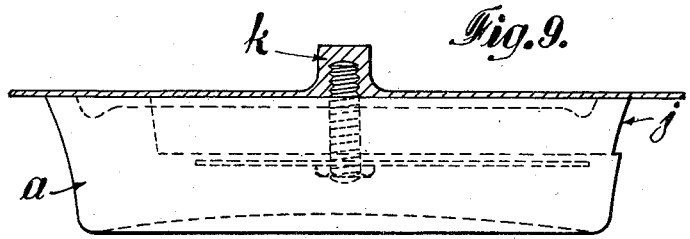

Figs. 9, 10 and 11 illustrate side, end and plan views respectively of a knee grip made to other than a circular shape and having a portion of its lower edge cut away to give room for a gear or brake lever.

In the example shown in Figs. 1 to 5, the rubber block $a$ of the knee grip is circular in shape circumferentially, slightly conical longitudinally, and slightly tapered in vertical cross-section. On the side furthest from the tank wall $b$, the rubber block is flat-sided and on the side next the tank wall, the block is formed with a recess $a^1$, the recess being circular and extending to points near to the edge of the block so as to leave only a narrow lip or rim at $a^2$, and so also as to leave the central parts of the block as unsupported as possible on the side next the tank. Moulded in the rubber block is the metal plate or washer $c$, which is of comparatively small diameter so as to leave the outer peripheral parts of the block free and flexible transversely. In one with, or secured to the plate is a screwed boss $d$. The plate is concentric to the rubber block, as also the boss (in the example shown), and in the rubber block and coaxial with the plate and boss, is a hole or sinking $e$. To the tank side $b$ is secured (soldered) a plate $f$ and extending from such plate is a screw $g$.

In fixing the knee grip to the tank side, the hole or sinking $e$ is placed over the end of the screw $g$ and the grip is then rotated, as a whole, to cause the screwed boss $d$ to engage the screw and draw the grip towards the tank, whereupon, owing to the resistance offered by the rim or edge $a^2$, the pad is flexed and its outer working face caused to assume a dished or concave formation, see Fig. 2.

Owing to the combined effects of the flexibility of the lip or rim $a^2$, the flexibility of the block, and the comparatively small diameter of the plate $c$, the block, when tightly screwed on to the screw $g$ (see Fig. 2), adapts itself accurately to the shape of the petrol tank, whether the latter be flat, or curved in one or more directions. Further, owing to the recess $a^1$ and to the flexibility of the lip or rim $a^2$, the block, when pressed tightly against the tank, adheres thereto by suction, and this helps in fixing the block to the tank, especially with repeated pressing of the block by the rider's knee.

The boss $d$ of the plate or washer $c$ and the sinking $e$ may be other than central, or there may be additional bosses and sinkings as shown in Fig. 6, whereby the grip may be fixed at various elevations or in various angular positions upon the side of the tank to suit the build of the rider, see Figs. 7 and 8. In this example, the screwing of the rubber block on to the screw $g$ effects the dishing of the working face of the block, even though the connection is eccentric to the centre of the block.

To lighten the plate $c$ and to allow of its being intermoulded with the rubber, it may have through holes $c^1$, see Fig. 5. Instead of being circular, the rubber block $a$ may be oval or oblong as in Fig. 9, and where room has to be left between the pad and the tank side for a gear or other lever, the pad is moulded to leave a gap $j$ between itself and the tank, see Fig. 10. In the case of circular blocks, the plate $c$ usually follows the shape of the block, but in the case of the shape of block shown in Fig. 9, the plate will preferably take the shape indicated by the dot-and-dash lines.

Instead of using the plate $f$, a preparation (such as a screwed bush $h$, Figs. 6 to 11) may be formed in the wall of the tank, and the screw $g$ engage such preparation as well as the boss $d$ of the plate $c$. In this connection the screw $g$ may be permanently connected to the plate.

What I claim is:—

1. Rubber knee grips for motor bicycles provided with an intermoulded metal plate and means by which the plate and grip may be secured to the cycle tank, and the grip being formed so as to allow of its central part being drawn towards the cycle tank after its outer periphery has come into contact with the tank, and thus cause the working face of the grip to be dished—or if already slightly dished to be further dished.

2. A knee grip for motor bicycles, composed of a slab-like block of soft, pliable india-rubber of suitable peripheral shape, with a recess of comparatively large diameter in the face requiring to fit next the cycle tank, a metal plate moulded in the rubber and of a shape and size such as to leave the outer peripheral parts of the rubber block flexible, and means for securing the block to the tank and at the same time causing it to flex and produce a dished or concave working face, as set forth.

3. A knee grip for motor bicycles, comprising a slab-like block of india-rubber of suitable peripheral shape, a metal plate with small central hole, and moulded in the rubber at a point nearer the rear face than the front working face, an internally screwed boss secured to said plate opposite the central hole, the block on the side requiring to lie next the cycle tank being formed with a recess which extends to points near the periphery of the rubber block and also being formed with a hole or sinking opposite the boss of the plate, the arrangement being such that the block can be "screwed" directly on to a projecting screw carried by the cycle tank and the working face of the block thereby caused to assume a concave formation, as set forth.

4. A knee grip for motor bicycles, characterized by a rubber block and a metal plate or washer intermoulded with said block, the plate or washer serving to allow of a connection being made between the grip and the machine and simultaneously dishing the front working face of the block, as set forth.

5. A knee grip for motor cycles comprising a slab-like block of spongy rubber, which is substantially circular in shape, and has a large diameter recess on its rear face, which leaves only a relatively thin lip or flange next the periphery of the block, a further recess or sinking in the block, and a relatively small metal plate moulded in the rubber and having a screwed aperture opposite the sinking whereby the block may be screwed on to a screw projecting from the cycle tank, as set forth.

In testimony whereof I have signed my name to this specification.

LUCIEN GAISMAN.